United States Patent Office 2,856,127
Patented Oct. 14, 1958

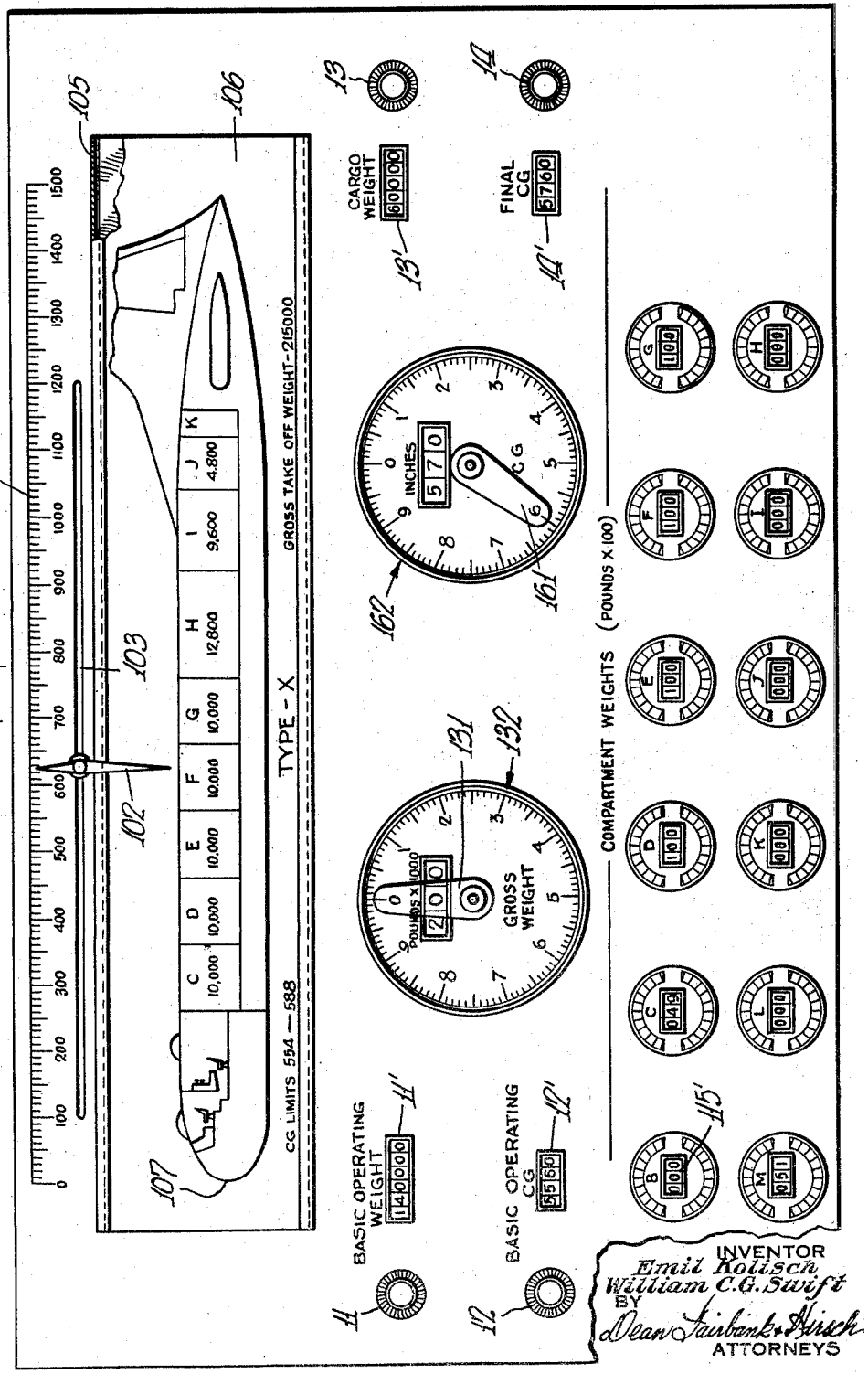

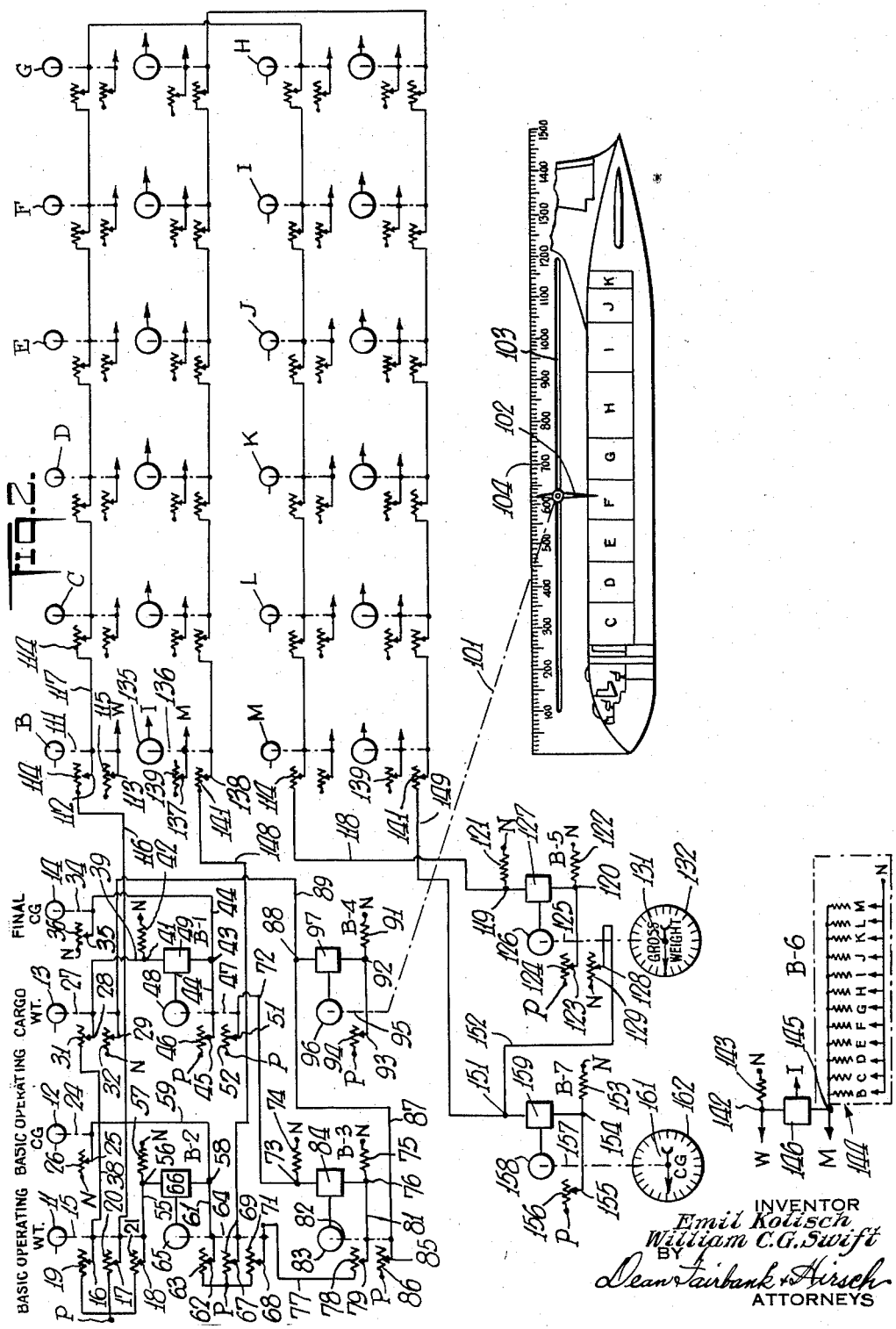

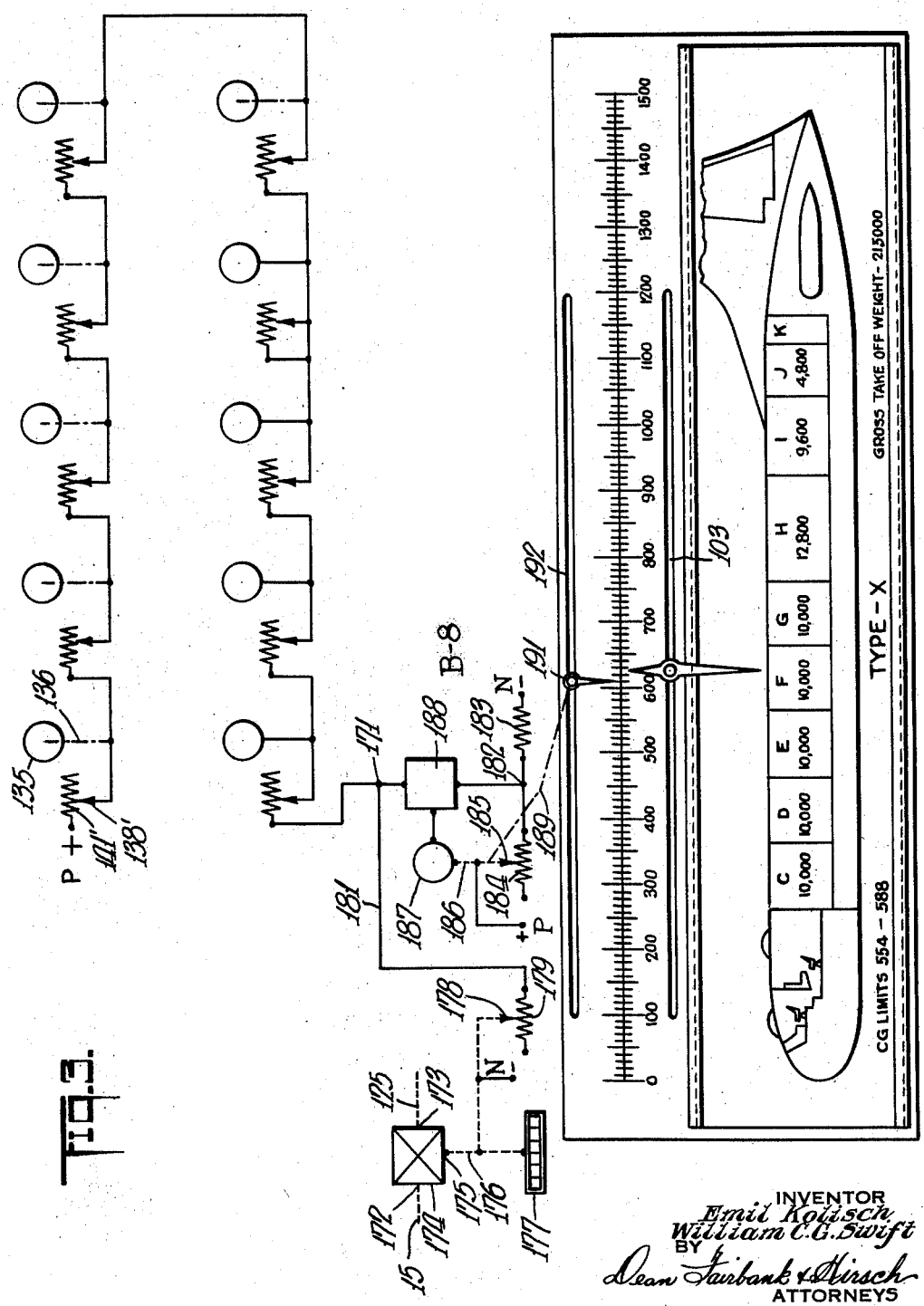

2,856,127

EQUIPMENT FOR PLANNING THE LOADING OF CARGO AIRCRAFT

Emil Kolisch, New York, and William C. G. Swift, Irvington, N. Y., assignors to Continental Electrolog Corp., a corporation of New York Application November 26, 1954, Serial No. 471,178

9 Claims. (Cl. 235—61)

In order for an aircraft to take off, fly and land safely, its center of gravity along the length of the aircraft must be at a location which may vary between certain definite fixed limits which are generally determined by the manufacturer of the aircraft, the optimum location generally being substantially midway between such limits.

As conducive to an understanding of the invention, it is noted that the basic weight of the aircraft, i. e., without fuel, crew, safety equipment or cargo, but including all standard equipment, is determined generally by utilizing suitable formulas in which the actual weight of the aircraft determined by suitable scales is a factor.

Assuming that the aircraft is to travel to a predetermined destination requiring a given fuel load, the weight of which is readily ascertainable, a specialist in the weights and balances division of the airport, taking into consideration the basic weight and basic center of gravity of the aircraft, as well as the weight of the crew, fuel and safety equipment and the location of such items, may determine by means of standard calculating devices well known in the art, the basic operating weight and basic operating center of gravity of the aircraft.

The payload or weight of cargo that can be carried by the aircraft is of course the permissible gross take-off weight less the basic operating weight.

According to one present loading practice, the cargo loading supervisor attempts to distribute the available cargo load along the length of the aircraft, so that the final center of gravity of the aircraft fully loaded with the available cargo, will fall within the permissible limits of the center of gravity, preferably at the optimum location.

Generally, the heaviest cargo is loaded into a compartment which is adjacent to or between the permissible limits of the center of gravity. The weights of the successive items of cargo, generally indicated on each item by the shipper or manufacturer, and their position in the aircraft are noted on the manifest as the loading proceeds.

After the aircraft has been loaded, the manifest is turned over to the weights and balances division of the airport which determines the final or take-off center of gravity of the aircraft as thus loaded.

Should the final center of gravity thus determined be outside of the permissible limits of the center of gravity, the cargo loading supervisor will be advised that the cargo is improperly loaded and must be shifted. Thus, if the aircraft is tail heavy, cargo must be shifted forward and if the aircraft is nose-heavy, cargo must be shifted toward the rear and the loading must then again be checked. It is apparent that such procedure is time-consuming and costly.

Where the final or take-off center of gravity of the aircraft is determined by means of a specially designed slide rule, or computed by the use of a standard calculating machine, to which the data from the manifest is transferred, the many manipulations required in the use of such units are time-consuming. Moreover, they are subject to human error as there is no indication or registration that remains throughout the determination of center of gravity of the various items of data entered into the computations and therefore no assurance that correct entries of data have been made. The calculations must accordingly be carefully checked and re-checked for errors and even with such checking and re-checking, there is no assurance that some error has not remained undetected.

Where to eliminate the need for shifting of cargo, planning of the cargo distribution is done before loading and such planning involves the use of a slide rule or calculating machine, the problems above noted render such planning operation time-consuming and subject to error and such difficulties are aggravated when problems of air-drops and off-loading must also be considered.

Where, after the aircraft is loaded and the center of gravity is determined by resort to the slide rule or calculating machine, as above pointed out, to be within safe limits, additional cargo must be loaded into the aircraft, the center of gravity must then be redetermined in the same manner as previously described with resultant delay in the take-off of the aircraft and without assurance that error does not remain.

It is accordingly among the objects of the invention to provide an equipment which is relatively simple, compact and readily portable, which may readily be assembled from substantially standard components, which is universally applicable by resort to a simple manipulation for use with any of various models, sizes and specifications of aircraft, which may readily and expeditiously be operated by even an unskilled person to solve numerous problems including the determination of the distribution of a given cargo load for a desired or take-off final center of gravity, the checking of the actual loading of an aircraft to determine whether its center of gravity falls within such limits, the re-checking of the loaded aircraft in the event additional cargo is added, and the determination of the effects on the center of gravity of off loading, air-drops and the like, all without the need for calculations of any sort, and which provides a fixed indication of the data set into the equipment for convenience in checking for correctness of entries.

According to one aspect of the invention, the equipment comprises facilities whereby electrical units, which may be resistors, inductances or capacitors, are set to values proportional to the basic operating moment and gross moment of the aircraft and such electrical units are correlated to determine the difference between such moments or the cargo moment of the aircraft. The correlating means sets another electrical unit to a value proportional to such cargo moment and such electrical unit is correlated with still another electrical unit set to a value proportional to the cargo weight to be carried, to determine the center of gravity of such cargo and such center of gravity is indicated in terms of its position with respect to the compartments of the aircraft.

According to another aspect of the invention, the equipment comprises facilities whereby electrical units are set to values proportional to the basic operating moment and basic operating weight of the aircraft, and additional electrical units corresponding respectively to the plurality of compartments of the aircraft may be set to values proportional to the weight of the cargo to be loaded into the associated compartment and the moment of such weight. The additional electrical units are connected for addition respectively to the basic operating moment and basic operating weight electrical units, and the moment and weight electrical units are correlated to determine their quotient of the center of gravity of the aircraft.

In the accompanying drawings in which are shown one or more of various possible embodiments of the several features of the invention, Fig. 1 is a diagrammatic view of the control panel of the equipment, Fig. 2 is a circuit diagram of the equipment, and Fig. 3 is a circuit diagram of a modification thereof.

Referring now to the drawings, the equipment has a plurality of manually operated control knobs 11, 12, 13 and 14 which may be adjusted respectively, to the basic operating weight of the aircraft (weight of aircraft including crew, fuel and safety equipment but without cargo), the basic operating center of gravity of the aircraft (distance from a predetermined reference datum of the center of gravity of the basic operating weight), the cargo weight to be loaded and the desired take-off or final center of gravity of the loaded aircraft.

Associated with each of the knobs 11, 12, 13 and 14 is a suitable indicating device 11', 12', 13' and 14' which may be counters of the type put out by the Veeder Root Co. and which are mechanically connected to the associated knob in conventional manner.

The basic operating weight knob 11 drives a shaft 15 to which are ganged the contact arms 16, 17 and 18 of variable electrical units, illustratively resistors 19, 20 and 21, each of which will be set to a value proportional to the basic operating weight. The basic operating center of gravity knob 12 drives a shaft 24 which controls the contact arm 25 of variable resistor 26 which will be set to a value proportional to the distance of the center of gravity of the basic operating weight from the reference datum of the aircraft, which, in the illustrative embodiment herein shown and described, is the nose of the aircraft. The cargo weight knob 13 drives a shaft 27 to which are ganged the contact arms 28 and 29 of variable resistors 31 and 32, each of which will be set to a value proportional to the cargo weight to be loaded. The take-off or final center of gravity knob 14 drives a shaft 34 which controls the contact arm 35 of variable resistor 36 which will be set to a value proportional to the distance of the desired final center of gravity of the loaded aircraft from the reference datum.

One end of each of the resistors 19, 20 and 21 is connected to positive main P and one end of each of the resistors 26, 32 and 36 is connected to negative main N.

The contact arm 16 of basic operating weight resistor 19 is connected by lead 38 to one end of cargo weight resistor 31, the contact arm 28 of which is connected by lead 39 to junction 41 of predetermined gross moment bridge B–1 so that series connected resistors 19 and 31 form one arm of said bridge. Also connected to junction 41 to form a second arm of bridge B–1 is one end of fixed resistor 42, the other end of which is connected to negative main N. Junction 43 of bridge B–1 is connected by lead 44 to contact arm 35 of final or take-off center of gravity resistor 36 and by lead 44' to the contact arm 45 of variable balancing resistor 46, one end of which is connected to positive main P so that resistors 36 and 46 form the third and fourth arms of bridge B–1. The contact arm 45 is driven by the shaft 47 of servo-motor 48, the input of which is connected to servo-amplifier 49 connected between junctions 41 and 43 of bridge B–1 so that when bridge B–1 is balanced, resistor 46 will be set to a value proportional to the gross moment of the aircraft. The shaft 47 also drives the contact arm 51 of a variable resistor 52, one end of which is connected also to positive main P and resistor 52 will also be set to a value proportional to such gross moment.

The contact arm 18 of basic operating weight resistor 21 is connected by lead 55 to junction 56 of basic moment bridge B–2 to form one arm of said bridge. Also connected to junction 56 is one end of fixed resistor 57, the other end of which is connected to negative main N, said resistor 57 forming a second arm of bridge B–2. Junction 58 of bridge B–2 is connected by lead 59 to contact arm 25 of basic operating center of gravity resistor 26 and by lead 61 to the contact arm 62 of variable balancing resistor 63, one end of which is connected to positive main P, so that resistors 26 and 63 form the third and fourth arms of bridge B–2. The contact arm 62 is driven by the shaft 64 of servo-motor 65, the input of which is connected to servo-amplifier 66, connected between junctions 56 and 58 of bridge B–2, so that when bridge B–2 is balanced resistor 63 will be set to a value proportional to the basic moment of the aircraft. The shaft 64 also drives the contact arms 67 and 68 of variable resistors 69 and 71, one end of each of which is connected to positive main P and said resistors 69 and 71, one end of each of which is connected to positive main P and said resistors 69 and 71 will also be set to such basic moment.

The contact arm 51 of gross moment resistor 52 is connected by lead 72 to junction 73 of bridge B–3 to form one arm of said bridge. One end of each of fixed resistors 74 and 75 is connected to junction 73 and 76 respectively of bridge B–3 and the other ends of said resistors are connected to negative main N so that resistors 74 and 75 form the second and third arms of said bridge.

The contact arm 68 of resistor 71 is connected by lead 77 to one end of balancing resistor 78 of bridge B–3, the contact arm 79 of said resistor 78 being connected by lead 81 to junction 76. The contact arm 79 is driven by the shaft 82 of servo-motor 83, the input of which is connected to servo-amplifier 84 connected between junctions 73 and 76 of bridge B–3 so that when bridge B–3 is balanced, resistor 78 will be set to a value proportional to the difference between the gross moment and basic moment of the cargo moment. The shaft 82 also drives the contact arm 85 of resistor 86, one end of which is connected to positive main P and said resistor 86 will also be set to a value proportional to the cargo moment.

The contact arm 85 of said resistor 86 is connected by lead 87 to junction 88 of cargo center of gravity bridge B–4 to form one arm of said bridge. Also connected to junction 88 by lead 89 is the contact arm 29 of cargo weight resistor 32 which forms a second arm of bridge B–4. One end of a fixed resistor 91 is connected to junction 92 of bridge B–4, the other end of said resistor being connected to negative main N and forming a third arm of said bridge. Also connected to junction 92 is the contact arm 93 of variable balancing resistor 94, one end of which is connected to positive main P. The contact arm 93 is driven by the shaft 95 of servo-motor 96, the input of which is connected to servo-amplifier 97, connected between junctions 88 and 92 of bridge B–4 so that when bridge B–4 is balanced resistor 94 will be set to a value proportional to the distance of the center of gravity of the cargo load from the reference datum.

The shaft 95 through a linkage diagrammatically represented by the shaft 101 drives a pointer 102 slidably mounted in a longitudinal slot 103 in the front panel of the equipment. Associated with the slot 103 is a scale marking 104 illustratively calibrated in inches from zero to 1500. The front panel also has a suitable channel 105 in which may be removably mounted a card 106 associated with the type of aircraft for which the loading is to be planned. The card 106 has the outline of an aircraft thereon and is positioned so that in the illustrative example shown the nose 107 of such aircraft is aligned with the zero reference point on the scale 104. The card may have printed thereon the aircraft type, the center of gravity limits, the gross take-off weight and the compartmentation of the aircraft with proper weight designations in each compartment indicating the maximum loading permitted in such compartment.

Means are provided to set into the equipment resistance of values proportional to the weight of cargo to be loaded into each of the compartments of the aircraft and also to the moments of such cargo. In the illustrative embodiment shown, the equipment is designed for use with an aircraft having no more than twelve compartments. It is of course to be understood that more compartments can be accommodated by mere addition of elements identical to those now to be described.

As shown in the drawings, a plurality of control knobs B through M inclusive are mounted on the front panel of the equipment. These knobs are related respectively to the plurality of compartments of the aircraft. Each of the control knobs has a shaft 111 which drives the contact arms 112 and 113 of variable compartment weight resistors 114 and 115. In addition, through a suitable linkage, each of the shafts 111 drives an associated indicator 115' which also may be a Veeder Root counter.

The contact arm 17 of basic operating weight resistor 20 is connected by lead 116 to end of resistor 114 associated with knob B. The contact arm 112 of said resistor 114 is connected by lead 117 to one end of resistor 114 associated with knob C. Similarly, the resistors 114 associated with knobs D through M are connected in series and the end of resistor 114 associated with knob M is connected by lead 118 to junction 119 of gross weight bridge B-5.

As the resistors 114 associated with knobs B through M will be set to values proportional to the weights to be placed into each of the associated compartments, and as such resistors are connected in series with resistor 20, which is set to the basic operating weight of the aircraft, it is apparent that the sum of the resistor 20 and the various resistors 114 will be proportional to the gross weight of the loaded aircraft and such series connected resistors 20 and 114 form one arm of the gross weight bridge B-5.

Connected respectively to junctions 119 and 120 of bridge B-5 is one end of fixed resistors 121 and 122, the free ends of which are connected to negative main N, said resistors 121 and 122 forming the second and third arms of said bridge B-5. Also connected to junction 120 of bridge B-5 is the contact arm 123 of variable balancing resistor 124, one end of which is connected to positive main P. The contact arm 123 of the resistor 124 is driven by the shaft 125 of servo-motor 126, the input of which is connected to servo-amplifier 127, connected between junctions 119 and 120 of the bridge so that when bridge B-5 is balanced, resistor 124 will be set to a value proportional to the gross weight of the aircraft.

The shaft 125 also drives the contact arm 128 of variable resistor 129, one end of which is connected to negative main N and resistor 129 will also be set to a value proportional to the gross weight of the aircraft. In addition, shaft 125 drives the pointer 131 of a gross weight indicator 132 of any suitable type so that the gross weight of the aircraft will be registered.

In the illustrative embodiment herein, the knobs B through M are so designed that after they have been set to the desired weight to be loaded into the respective compartments, they can be pushed inwardly to actuate the compartment moment bridge B-6 and as long as each knob is retained in such position, the bridge B-6 will remain actuated.

Associated with each of the knobs is a servo-motor 135, the shaft 136 of which drives the contact arms 137, 138 of a variable balancing resistor 139 and a second variable moment resistor 141. Each of the knobs controls four switches (not shown) which, when closed by the pressing of the associated knob, will perform the following functions: (a) the contact arm 113 of the associated compartment weight resistor 115 is connected to junction 142 of bridge B-6 so that said resistor 115 forms one arm of said bridge, said junction having permanently connected thereto one end of a fixed resistor 143, the other end of which is connected to negative main N, said resistor 143 forming a second arm of said bridge B-6; (b) one of the compartment arm resistors 144B-M, each of which is of value proportional to the distance of the centroid of the associated compartment to the reference datum, is connected to junction 145 of bridge B-6 to form a third arm of said bridge; (c) the contact arm 137 of the associated balancing resistor 139 is connected to said junction 145 to form a fourth arm of said bridge B-6 and (d) the input of the associated servo-motor 135 is connected to the servo-amplifier 146 of bridge B-6, said servo-amplifier being connected between junctions 142 and 145.

As a different set of resistors 144B-M is required for each type of aircraft, they may be contained in a suitable adaptor which can readily be plugged into the equipment.

Thus, when bridge B-6 is in balance, for each of the compartments B through M, the associated servo-motor 135 will set the related resistor 139 to a value proportional to the product of the weight to be loaded into the associated compartment and the arm of such weight or the moment of the weight in the compartment. In addition, the resistor 141 associated with each compartment will also be set by shaft 136 to this value.

The moment resistors 141 associated with compartments B through M are connected in series in the same manner as previously described with respect to resistors 114. One end of resistor 141 associated with knob B is connected by lead 148 to the contact arm 67 of basic moment resistor 69 and one end of resistor 141 associated with knob M is connected by lead 149 to junction 151 of center of gravity bridge B-7.

As the resistors 141 associated with knobs B through M will be set to values proportional to the moment of the weight to be placed into each of the associated compartments, and as such resistors are connected in series with resistor 69 which is set to the basic moment of the aircraft, it is apparent that the sum of the resistor 69 and the various resistors 141 will be proportional to the gross moment of the loaded aircraft and such series connected resistors 69 and 141 form one arm of the center of gravity bridge B-7.

Also connected to junction 151 of bridge B-7 by lead 152 is the gross weight resistor 129 which forms a second arm of bridge B-7. A fixed resistor 153 is connected at one end to junction 154 and at its other end to negative main N, said resistor 153 forming a third arm of the bridge.

Also connected to junction 154 is the contact arm 155 of variable balancing resistor 156, one end of which is connected to positive main P, said resistor 156 forming the fourth arm of bridge B-7. The contact arm 155 is driven by the shaft 157 of servo-motor 158, the input of which is connected to servo-amplifier 159 connected between junctions 151 and 154 of bridge B-7 so that when the bridge B-7 is balanced, resistor 156 will be set to a value proportional to the distance of the center of gravity of the aircraft from the reference datum.

The shaft 157 also drives the pointer 161 of a center of gravity indicator 162 of any suitable type so that the center of gravity of the aircraft is registered.

*Operation*

In order to illustrate the operation of the equipment, it will be assumed that the planning of the loading of an aircraft type X having eight compartments, is to be accomplished and such aircraft has the following characteristics: (a) basic operating weight 140,000 pounds; (b) basic operating center of gravity 556 inches; (c) cargo weight to be loaded 60,000 pounds; (d) desired take-off center of gravity 576 inches; (e) center of gravity limits, fore 554 inches and aft 588 inches.

In addition, the characteristics of the compartments of the aircraft are as follows:

| Compartment | Centroids | Max. Capacity, lbs. |
|---|---|---|
| C | 310 | 10,000 |
| D | 410 | 10,000 |
| E | 510 | 10,000 |
| F | 610 | 10,000 |
| G | 710 | 10,000 |
| H | 840 | 12,800 |
| I | 980 | 9,600 |
| J | 1,080 | 4,800 |

The weight resistors in the illustrative embodiment are calibrated so that one ohm is related to a hundred pounds; the moment resistors are calibrated so that one ohm is related to 100,000 inch pounds and the distance resistances are calibrated so that one ohm is related to one inch.

To ready the equipment for the planning operation, basic operating weight knob 11 is turned so that resistors 19, 20 and 21 each will be set to 1,400 ohms and a weight of 140,000 pounds will be indicated on the associated indicator 11'. The basic operating center of gravity knob 12 is turned so that the resistor 26 will be set to 556 ohms and a basic operating center of gravity of 556 inches will be indicated on indicator 12'. The cargo weight knob 13 is turned so that the resistors 31 and 32 each will be set to 600 ohms and the cargo weight indicator 13' will indicate 60,000 pounds. The take-off center of gravity knob 14 is turned so that resistor 36 will be set to 576 ohms and a take-off center of gravity of 576 inches will be indicated on indicator 14'.

As the basic operating weight resistor 21 has been set to a value of 1,400 ohms proportional to the basic weight of 140,000 pounds; as the basic operating center of gravity resistor 26 has been set to a value of 556 ohms related to a center of gravity of 556 inches and the fixed resistor 57 has a value of 1,000 ohms, by the formula:

$$\frac{\text{basic operating weight (resistor 21)}}{K \text{ (resistor 57)}} = \frac{\text{basic moment (resistor 63)}}{\text{basic operating center of gravity (resistor 26)}}$$

when bridge B-2 reaches balance, the servo-motor 65 will have set resistor 63 to a value of 778.4 ohms which is proportional to a basic moment of 77,840,000 inch pounds. At the same time the resistors 69 and 71 will also be set by the servo-motor 65 to 778.4 ohms.

As the resistor 19, has been set to a value of 1,400 ohms, proportional to the basic operating weight of 140,000 pounds, is connected in series with cargo weight resistor 31 which has been set to a value of 600 ohms proportional to the cargo weight of 60,000 pounds; as the desired final center of gravity resistor 36 has been set to 576 ohms related to a center of gravity of 576 inches, and the fixed resistor 42 has a value of 1,000 ohms, by the formula:

$$\frac{\text{basic operating weight} + \text{cargo (resistors 19} + \text{31)}}{K \text{ (resistor 42)}} = \frac{\text{gross moment (resistor 46)}}{\text{final center of gravity (resistor 36)}}$$

when bridge B-1 reaches balance, the servo-motor 48 will have set resistor 46 to a value of 1,152 ohms which is proportional to the predetermined gross moment of 115,200,000 inch pounds. The resistor 52 will also have been set by servo-motor 48 to a value of 1,152 ohms.

As the resistor 52 has been set to a value of 1,152 ohms proportional to the gross moment of 115,200,000 inch pounds; as the resistor 71 which has been set to a value of 778.4 ohms proportional to the basic moment of 77,840,000 inch pounds is connected in series with resistor 78 of bridge B-3 and the resistors 74 and 75 each has a value of 1,000 ohms, by the formula:

$$\frac{\text{gross moment (resistor 52)}}{K \text{ (resistor 74)}} = \frac{\text{basic moment} + \text{cargo moment (resistors 71} + \text{78)}}{K \text{ (resistor 75)}}$$

when bridge B-3 reaches balance the servo-motor 83 will have set resistor 78 to a value equal to the difference between the values of resistors 52 (1,152 ohms) and resistor 71 (778.4 ohms) or 373.6 ohms which is proportional to the cargo moment, i. e., 37,360,000 inch pounds. At the same time, the resistor 86, which is also driven by servo-motor 81, will similarly be set to 373.6 ohms.

As the resistor 86 has been set to a value of 373.6 ohms proportional to the remaining cargo moment of 37,360,000 inch pounds; as resistor 32 has been set to a value of 600 ohms proportional to the cargo weight and as fixed resistor 91 has a value of 1,000 ohms, by the formula:

$$\frac{\text{cargo moment (resistor 86)}}{\text{cargo weight (resistor 32)}} = \frac{\text{cargo C. G. (resistor 94)}}{K \text{ (resistor 91)}}$$

when bridge B-4 reaches balance the servo-motor 96 will have set resistor 94 to a value of 622⅔ ohms which is proportional to the cargo center of gravity of 622⅔ inches, i. e., the distance of the center of gravity of the cargo weight of 60,000 pounds from the reference datum or the nose of the aircraft.

The servo-motor 96, which sets resistor 94, also through shaft 101, will set the pointer 102 to a position along the scale 104 correlated with the center of gravity of 622⅔ inches. As the card 106 of the type X aircraft to be loaded is positioned in the channels 105, the indicator 102 will denote a location in compartment F, 12⅔ inches aft of the centroid of such compartment.

As the resistor 20, which has a value of 1,400 ohms related to the basic operating weight of the aircraft of 140,000 pounds is connected in series with resistors 114 associated with knobs B through M and as such resistors 114 initially have zero value, the combined value of resistor 20 and resistors 114 will initially be 1,400 ohms and as the resistors 121 and 122 each has a value of 1,000 ohms, by the formula:

$$\frac{\text{basic operating weight} + \text{compartment weight (resistors 20} + \text{114)}}{K \text{ (resistor 121)}} = \frac{\text{gross weight (resistor 124)}}{K \text{ (resistor 122)}}$$

when bridge B-5 reaches balance, the servo-motor 126 will have set resistor 124 to a value of 1,400 ohms which is proportional to the gross weight of 140,000 pounds of the unloaded aircraft. At the same time the resistor 129 will also have been set to a value of 1,400 ohms and the shaft 125 driven by servo-motor 126 will set the pointer 131 of indicator 132 to such value of 140,000 pounds.

As the resistor 69, which has a value of 778.4 ohms proportional to a basic cargo moment of 77,840,000 inch pounds is connected in series with the resistors 141 associated with knobs B through M inclusive, and as such resistors 141 initially are at zero value, the combined value of resistor 69 and resistors 141 will initially be 778.4 ohms.

As the resistor 129 has a value of 1,400 ohms proportional to the weight of 140,000 pounds and as the resistor 153 has a value of 1,000 ohms, by the formula:

$$\frac{\text{basic moment} + \text{compartment moments (register 69+141)}}{\text{gross weight (resistor 129)}} =$$

$$\frac{\text{center of gravity (resistor 156)}}{K \text{ (resistor 153)}}$$

when bridge B–7 reaches balance the servo-motor 158 will have set resistor 156 to a value of 556 ohms which is proportional to center of gravity of the aircraft of 556 inches. The shaft 157 of servo-motor 158 will also set the pointer 161 of the center of gravity indicator 162 to such value of 556 inches.

By inspection of the center of gravity indicator 162 which initially shows 556 inches and the desired take-off center of gravity indicator 14' which shows 576 inches, it is apparent that the cargo weight of 60,000 pounds must be loaded into the compartments of the aircraft in such manner that the center of gravity of the aircraft will be shifted aft.

By distributing the total cargo weight of 60,000 pounds into the compartments of the aircraft on both sides of the position shown by pointer 102 so that the sum of the moments of the weights on each side of such position with respect to the position of the pointer is the same, the center of gravity of the total cargo weight would be equal to 622⅔ inches so that the exact final center of gravity of 576 inches would be achieved for the loaded aircraft.

For a typical load distribution, the knobs D, E, F, G and H are turned so that the resistors 114 associated therewith will each be set, for example, to a value of 100 ohms proportional to a weight of 10,000 pounds, such value of 10,000 pounds being indicated on the associated indicator for each knob. The knobs C and I are turned to set the associated resistors 114 to a value of 50 ohms, proportional to a weight of 5,000 pounds, such value of 5,000 pounds being indicated on the associated indicator. As the knobs B, J, K, L and M are not turned, the associated resistors 114 will remain at zero value.

As the series connected resistors 114 associated with knobs B through M now have a total value of 600 ohms, and as such resistors are in series with basic operating weight resistor 20, which has a value of 1,400 ohms, when the gross weight bridge B–5 reaches balance, the resistor 124 will have been set to a value of 2,000 ohms proportional to the gross weight of 200,000 pounds. This gross weight of 200,000 pounds will be shown on the indicator 132. As each knob C through I is set to the desired weight, it is pressed to connect the bridge B–7 into circuit as previously described. Thus, for example, referring to knob C, the resistor 115 associated therewith will be set to a value of 50 ohms related to a weight of 5,000 pounds as the fixed resistor 143 has a value of 1,000 ohms and the resistor 144C has a value of 310 ohms related to the centroid of compartment C of 310 inches, by the formula:

$$\frac{\text{compartment weight (resistor 115)}}{K \text{ (resistor 143)}} =$$

$$\frac{\text{compartment moment (resistor 139)}}{\text{arm (resistor 144C)}}$$

when the bridge B–6 reaches balance for compartment C, the resistor 139 will have been set to a value of 15.5 ohms which is proportional to a moment of 1,550,000 inch pounds. In addition, the resistor 141 associated with the knob C will also be set to this value.

The following chart relates to the setting of resistors 141 associated with knobs C through I for the weights above noted:

| Resistor | Compartment Weight | × Centroid | ÷ Constant | = Setting |
|---|---|---|---|---|
| 141C | 50 | 310 | 1,000 | 15.5 |
| 141D | 100 | 410 | 1,000 | 41.0 |
| 141E | 100 | 510 | 1,000 | 51.0 |
| 141F | 100 | 610 | 1,000 | 61.0 |
| 141G | 100 | 710 | 1,000 | 71.0 |
| 141H | 100 | 840 | 1,000 | 84.0 |
| 141I | 50 | 980 | 1,000 | 49.0 |

As the resistors 141 are in series the total value thereof will be equal to 372.5 ohms which is proportional to the total cargo moment of 37,250,000 inch pounds.

As the resistors 141 are in series with the basic moment resistor 69, which has a value of 778.4 ohms proportional to a total moment of 77,840,000 inch pounds, the sum of the basic moment resistor 69 and the cargo moment resistors 141 is equal to 1,150.9 ohms or 115,090,000 inch pounds.

The bridge B–7 will thus have in one arm resistance of value equal to 1,150.9 ohms which is proportional to the gross moment of 115,090,000 inch pounds and in another arm resistance of 2,000 ohms which is proportional to the gross weight of 200,000 pounds. Thus when bridge B–7 reaches balance by the formula above set forth, the resistor 156 will have been set to a value of 575.45 ohms which is proportional to a center of gravity of 575.45 inches. This value is well within the center of gravity limits of the aircraft, i. e., between 554 and 588 inches, and hence the aircraft could be loaded according to the weight distribution heretofore described.

However, if for any reason a more precise distribution is desired, since the desired take-off center of gravity is equal to 576 inches, it is apparent that there must be a redistribution of the load so that the center of gravity will be shifted aft. To accomplish this, more weight must be placed to the right of the pointer 102.

As only a slight shift in center of gravity is desired, i. e., .55 inch, the weight in compartment C, for example, is decreased by 100 pounds and the weight in compartment I is increased by 100 pounds. The change of weight in compartments C and I is readily made by adjusting the control knobs C and I. As the total weight has remained the same, there will be no effect on gross weight bridge B–5. In the manner previously described, bridge B–6 will determine the new moments of compartments C and I based upon the new weight distribution therein and the equipment will automatically re-compute the new center of gravity.

As the resistors 141 associated with knobs C and I will have their values decreased by .31 ohm and increased by .98 ohm respectively, the new center of gravity is equal to:

$$\frac{\text{basic moment} + \text{compartment moment} + \text{corrections for compartments C and I}}{\text{gross weight}} =$$

$$\frac{\text{center of gravity}}{K}$$

$$\frac{778.4 + 372.5 + (.98 - .31)}{2,000} = \frac{\text{center of gravity}}{1,000}$$

or center of gravity=575.8 ohms=575.88 inches which is still .12 inch from the desired take-off center of gravity.

A new cargo adjustment is made by decreasing the weight in compartment C by 50 pounds and increasing the weight in compartment I by 50 pounds.

As previously described, the center of gravity is now equal to:

$$\frac{778.4 + 373.17 + (.48 - .155)}{2,000} = \frac{\text{center of gravity}}{1,000}$$

or center of gravity =576 ohms=576 inches which is exactly the desired take-off center of gravity.

A loading chart may then be made up for the aircraft type X indicating that the load of 60,000 pounds, to achieve the desired take-off center of gravity of 576 inches, must be distributed so that compartments D, E, F, G and H each have 10,000 pounds; compartment C has 4,850 pounds and compartment I has 5,150 pounds.

When this loading chart is handed to the Cargo Loading Supervisor he can prepare pallets having loads of the indicated weights thereon for the respective compartments so that when the aircraft type X is to be loaded, the pallets can be moved into position and the articles thereon loaded into the designated compartments in the aircraft. With this procedure no time-consuming calculations at time of take-off are required for determining the center of gravity of the aircraft as the proper cargo distribution has been planned as previously described prior to the actual loading. In addition, no time-consuming and laborious shifting and reshifting of cargo is required to properly balance the aircraft. Consequently, the waiting time of the aircraft, due to the need for cargo shifting and weight and balance calculations after loading is eliminated with resultant increase in the speed of transfer of cargo, and hence the reduction of the number of aircraft required in a given period.

In addition to its utility in planning the distribution of a given load into an aircraft, the equipment above described has utility in determining the effect, on the center of gravity of the aircraft, of an air-drop or other discharge of cargo from the aircraft. Thus, for example, assuming that it is desired to have an air-drop of 2,500 pounds from compartment C, the knob C is adjusted so that the value of weight in said compartment is reduced by 2,500 pounds. As the result, the gross weight of the aircraft will be reduced by 2,500 pounds and resistor 129 will be set by bridge B–5 to a value of 1,975 ohms. In the manner previously described, the compartment moment resistor 141 associated with compartment C will have its value reduced by 7.75 ohms which is proportional to the reduction in the moment of the cargo in compartment C of 775,000 inch pounds. As a result, the new center of gravity is equal to:

$$\frac{1151.895 - 7.75}{1,975} = \frac{\text{center of gravity}}{1,000}$$

and the center of gravity=579.0 ohms=579.0 inches, the new center of gravity of the aircraft. This amount is clearly within the center of gravity limits of 554 and 588 previously set forth and hence with such air-drop it is rapidly determined that the center of gravity of the aircraft will be within safe limits.

From the foregoing it is obvious that it is a relatively simple matter to find almost instantaneously the center of gravity shift due to the addition or removal of cargo both in flight and on the ground. Complex problems in fuel consumption, flight refueling and so forth can readily be solved by having appropriate controls which permit the addition or subtraction of the amount of fuel, weight of cargo and so forth.

The equipment also may be used to determine the center of gravity of an aircraft which has already been loaded. For this purpose, it is merely necessary to set into the equipment the basic operating weight and basic operating center of gravity of the aircraft and to set each of the compartment knobs B through M to the appropriate weight loaded into the compartment which may be determined from the manifest.

In the event that cargo is to be loaded at the last minute, for example, by merely setting the weight of such cargo into the compartment in which it is to be loaded, the new center of gravity of the aircraft will quickly be determined. If it is not within safe limits, by appropriate setting of one or more of the control knobs associated with other compartments, the amount of cargo weight that must be removed from such other compartments to achieve the desired center of gravity may quickly be determined without need for calculations.

In the modification shown in Fig. 3 which includes all of the components shown in Figs. 1 and 2, additional means are provided to indicate the cumulative center of gravity of the cargo with respect to the reference datum of the aircraft, as such cargo is distributed into the respective compartments of said aircraft.

Such means comprises an additional moment resistor 141' associated with each of the knobs B through M inclusive respectively and having a contact arm 138' set by the shaft 136 of the associated servo-motor 135 in the same manner as the contact arm 138 of the resistor 141. One end of the resistor 141' associated with knob B is connected to positive main P and said plurality of resistors 141' are connected in series to the junction 171 of cumulative cargo center of gravity bridge B–8 to form one arm of said bridge.

The shafts 15 and 125, controlled by basic operating knob 11 and gross weight bridge servo-motor 126, drive the inputs 172 and 173 respectively of a differential unit 174, the output 175 of which will be set to a position related to the difference between the settings of shafts 125 and 15 or the difference between gross weight and basic operating weight.

The output 175 of differential unit 174, through shaft 176, drives an indicator 177, also preferably a Veeder Root counter, which may be mounted on the front panel of the equipment to show the cumulative cargo weight as it is distributed into the various compartments of the aircraft by the setting of the respective knobs B through M. The shaft 176 also drives the contact arm 178 of a variable resistor 179 to set the latter to a value proportional to the cumulative weight of cargo distributed into the aircraft. The contact arm 178 is connected to negative main N and one end of resistor 179 is connected by lead 181 to junction 171 of bridge B–8 to form a second arm of said bridge.

Connected to junction 182 of bridge B–8 is one end of a fixed resistor 183, the other end of which is connected to negative main N, said resistor forming a third arm of bridge B–8. Also connected to junction 182 to form the fourth arm of bridge B–8 is one end of a balancing resistor 184 which has a contact arm 185 connected to positive main P. The contact arm 185 is driven by the shaft 186 of servo-motor 187, the input of which is connected to the output of servo-amplifier 188 connected between junctions 171 and 172 of bridge B–8.

The shaft 186 through a linkage, diagrammatically represented by the shaft 189, drives a pointer 191 slidably mounted in a longitudinal slot 192 also in the front panel of the equipment and extending parallel to the slot 103. The slot 192 is preferably identical in length to the slot 103 and the pointer 191 is designed to coact with the scale markings 104.

The operation of the embodiment shown in Fig. 3 will also be described with an aircraft type X.

When the basic operating weight knob 11, the basic operating center of gravity knob 12, the cargo weight knob 13 and the final center of gravity knob 14 are set as previously described, the inputs 172 and 173 of differential unit 174 will be set by shafts 15 and 125 respectively to positions related to the basic operating weight of 140,000 pounds and to the gross weight which at this time is also 140,000 pounds. As the output 175 of the differential unit 174 is set to a position related to the difference between these values, the counter 177 driven by shaft 176 will indicate zero.

Assuming that the knob associated with compartment F is set to a position related to a weight of 10,000 pounds, as previously described, the associated resistor 141' will be set by the associated servo-motor 135 to a value proportional to the moment of such weight in compartment F or to a value of 61 ohms which is proportional to the moment of 6,100,000 inch pounds and the shaft 125 of bridge B–5 will rotate to a position related to the basic operating weight plus such weight of 10,000 pounds or a total weight of 150,000 pounds. As the shaft 15 connected to input 172 of differential unit 174 is set to a position related to a value of 140,000 pounds, the output 175 of the differential unit 174 will be set to a value related to the difference or to 10,000 pounds and through shaft 176 the counter 177 will be set to indicate such value of 10,000 pounds and the resistor 179 will be set to a value of 100 ohms proportional to such weight.

As the fixed resistor 183 has a value of 1,000 ohms, by the formula:

$$\frac{\text{cargo moment (resistors 141')}}{\text{cargo weight (resistor 179)}} = \frac{\text{center of gravity (resistor 184)}}{K \text{ (resistor 183)}}$$

when bridge B–8 reaches balance, the servo-motor 187 will have set resistor 184 to a value of 610 ohms which is proportional to the center of gravity of the cargo in compartment F of 610 inches, i. e., the distance of the center of gravity of the cargo weight of 10,000 pounds in compartment F from the reference datum or the nose of the aircraft.

The servo-motor 187 also, through shaft 189, will set the pointer 191 to a position along scale 104 correlated with the center of gravity of 610 inches. As the pointer 102 has been previously set to 622⅔ inches, the cargo loading supervisor has a visual indication that the remaining cargo must be loaded in such manner that the cargo center of gravity as indicated by pointer 191 will move aft.

Assuming that the knobs associated with compartments C, D, E, G, H, and I are then set to weights of 5,000, 10,000, 10,000, 10,000, 10,000 and 5,000 pounds respectively, for an additional weight of 50,000 pounds and a total additional moment of 31,150,000 inch pounds, the resistor 179 will be set to a value of 600 ohms and the series connected resistors 141' will have a combined value of 372.5 ohms.

Hence, by the formulae above set forth, when bridge B–8 is in balance, the resistor 184 will be set to a value of 620.8 ohms and the pointer will be set to such position along scale 104.

As pointer 191 will be spaced from pointer 102 by a distance equivalent to slightly less than two inches, it affords a clear indication to the Cargo Loading Supervisor that substantially the desired loading has been achieved and this can be checked by inspection of indicators 162 and 14'. It also indicates that to achieve the desired final center of gravity, weight must be shifted from a compartment forward of the position indicated by pointer 102 to a compartment aft of such position until the pointers 102 and 191 are aligned.

The embodiment shown in Fig. 3 has particular utility during the planning operation as it provides a constant indication of the location of the cargo center of gravity during distribution of the entire cargo and hence facilitates the planning operation so that the need for redistribution of the cargo load is kept to a minimum.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. Equipment of the character described for planning the distribution of a given load into an aircraft for desired center of gravity, said equipment comprising a plurality of electrical units, means for setting said units to values proportional respectively to the basic operating weight of the aircraft, the basic operating moment of the aircraft with respect to a predetermined reference datum, the predetermined gross moment of the aircraft with respect to such reference datum and the weight to be loaded into the aircraft, means for correlating the gross moment and basic operating moment electrical units to determine the difference therebetween, an electrical unit controlled by said correlating means to be set to a value proportional to such difference or the moment of the weight to be loaded, a second means for correlating the weight to be loaded electrical unit and the moment of the weight to be loaded electrical unit to determine the quotient of the moment and the weight to be loaded, means controlled by said second correlating means to indicate such quotient in terms of distance from a predetermined reference datum of the aircraft, a plurality of manually operated control means corresponding respectively to different regions of the aircraft, each of said control means having at least a pair of electrical units associated therewith, means actuated by the setting of the control means to set the associated pair of electrical units to values proportional respectively to the weight to be loaded into the associated region of the aircraft and to the moment of such weight with respect to such predetermined reference datum, means connecting the electrical units of the pairs associated with said plurality of control means for addition thereof respectively to the basic operating weight electrical unit and the basic moment electrical unit to provide the gross weight and gross moment respectively, means for correlating the additively connected weight and moment electrical units to determine the quotient of gross moment divided by gross weight and means controlled by said correlating means to indicate said quotient or the center of gravity of the aircraft.

2. Equipment of the character described comprising a pair of electrical units, means for setting said units to values proportional respectively to the basic operating weight of an aircraft and to the basic operating moment of such aircraft with respect to a predetermined reference datum, a plurality of manually operated control means corresponding respectively to different regions of such aircraft, each of said control means having at least a pair of electrical units associated therewith, means actuated by the setting of the control means to set the associated pair of electrical units to values proportional respectively to the weight to be loaded into the associated region of the aircraft and to the moment of such weight with respect to such predetermined reference datum, the means for setting the basic operating moment electrical unit to a value proportional to the basic operating moment of the aircraft comprising an additional electrical unit under control of the basic operating weight setting means, to be set to a value proportional to the basic operating weight of the aircraft, an electrical unit having associated means to set the latter to a value proportional to the basic operating center of gravity of the aircraft with respect to such predetermined reference datum, means for correlating said additional electrical unit and said basic operating center of gravity electrical unit to determine the product of basic operating weight and basic operating center of gravity or the basic moment of the aircraft and means controlled by said last named correlating means to set said basic operating moment electrical unit, means connecting the electrical units of the pairs associated with said plurality of control means for addition thereof respectively to the basic operating weight electrical unit and the basic operating moment electrical unit to provide the gross weight and gross moment respectively, means for correlating the additively connected weight and moment electrical units to determine the quotient of gross moment divided by gross weight and means controlled by said correlating means to indicate such quotient or the center of gravity of the aircraft.

3. The combination set forth in claim 2 in which the means for correlating the additional and the basic operating center of gravity electrical units comprises a bridge in which the additional and the basic operating center of gravity electrical units form two opposed arms and a balancing electrical unit forms a third arm, means controlled by unbalance of said bridge to set said balancing electrical unit to a value proportional to the product of basic operating weight and basic operating center of gravity, said means also setting said basic moment electrical unit.

4. Equipment of the character described comprising a pair of electrical units, means for setting said units to values proportional respectively to the basic operating weight of an aircraft and to the basic operating moment of such aircraft with respect to a predetermined reference datum, a plurality of manually operated control means corresponding respectively to different regions of such aircraft, each of said control means having at least a pair of electrical units associated therewith, means actuated by the setting of the control means to set the associated pair of electrical units to values proportional respectively to the weight to be loaded into the associated region of the aircraft and to the moment of such weight with respect to such predetermined reference datum, the means to set the electrical unit of the pair associated with each control means to a value proportional to the moment of the weight in the associated region, comprises an additional electrical unit under control of the associated control means to be set to a value proportional to the weight to be loaded into the associated region, an electrical unit of value proportional to the distance of a predetermined location in the associated region from the reference datum, means for correlating said additional electrical unit and the distance electrical unit to determine the product of the weight to be loaded into the associated region and the distance of the predetermined location in such region from the reference datum or the moment of the weight in such region and means controlled by said last named correlating means to set the electrical unit of the pair associated with the control means to a value proportional to the moment of the weight in the associated region, means connecting the electrical units of the pairs associated with said plurality of control means for addition thereof respectively to the basic operating weight electrical unit and the basic operating moment electrical unit, means connecting the electrical units of the pairs associated with said plurality of control means for addition thereof respectively to the basic operating weight electrical unit and the basic operating moment electrical unit to provide the gross weight and gross moment respectively, means for correlating the additively connected weight and moment electrical units to determine the quotient of gross moment divided by gross weight and means controlled by said correlating means to indicate such quotient of the center of gravity of the aircraft.

5. The combination set forth in claim 4 in which the distance electrical unit is part of a single replaceable plug-in adaptor by which it may readily be introduced into circuit for each model of aircraft as required.

6. The combination set forth in claim 4 in which the means for correlating the additional and the distance electrical units comprises a bridge circuit common to all of said plurality of control means, means in said bridge circuit to provide an electrical output of value related to the unbalance of said bridge, a plurality of motors associated respectively with said control means, a plurality of balancing electrical units associated respectively with said control means and operatively connected to an associated motor to be set thereby, means associated with each of said control means to connect the additional and the distance electrical units associated with each region, in two opposed arms of said bridge circuit, the balancing electrical unit in a third arm of said bridge circuit and the associated motor to the means in said bridge circuit having such electrical output, whereby when the means associated with each of said control means is successively actuated and the bridge reaches balance, the balancing unit associated with the actuated means will have been set to a value proportional to the product of the weight loaded into the associated region and the distance of the predetermined location from the reference datum or the moment of the weight loaded into the associated region and means controlled by said motors to set the electrical unit of the pair associated with said control means to a value proportional to the moment of the weight in the associated region.

7. Equipment of the character described for planning the distribution of a given load into an aircraft for desired center of gravity, said equipment comprising a pair of electrical units, means for setting said units to values proportional respectively to the basic operating moment and the gross moment of the aircraft with respect to a predetermined reference datum, means for correlating said pair of electrical units to determine the difference between gross moment and basic operating moment, an electrical unit controlled by said correlating means to be set to a value proportional to such difference or the moment of the weight to be loaded, an additional electrical unit, means to set the latter to a value proportional to the weight to be loaded into the aircraft, a second means for correlating said electrical unit and said additional electrical unit, to determine the quotient of the moment divided by the weight to be loaded and means controlled by said last named correlating means to indicate said quotient in terms of distance from a predetermined reference datum of the aircraft.

8. The combination set forth in claim 7 in which the means for setting the pair of electrical units to values proportional respectively to basic moment and gross moment comprises four electrical units, means to set the latter to values proportional respectively to basic operating weight, basic operating center of gravity, weight to be loaded and final center of gravity, a further electrical unit, means to set the latter to a value proportional to the basic operating weight, means for correlating said basic operating weight and basic operating center of gravity electrical units to determine the product of basic weight and basic center of gravity, means controlled by said correlating means to set said basic moment electrical unit, means additively connecting said further basic operating weight electrical unit and said weight to be loaded electrical unit, means for correlating said additively connected electrical units and said final center of gravity electrical unit to determine the product of gross weight and final center of gravity and means controlled by said last named correlating means to set said gross moment electrical unit.

9. The combination set forth in claim 7 in which the means to indicate said quotient in terms of distance, comprises an elongated scale having an indicator movable longitudinally thereof and controlled by said second correlating means, said scale having a marking related to the reference datum of an aircraft and means to mount a printed outline of an aircraft in juxtaposition to said scale with the reference data of the aircraft aligned with the corresponding scale marking.

References Cited in the file of this patent

UNITED STATES PATENTS

| | | |
|---|---|---|
| 2,443,098 | Dean | June 8, 1948 |
| 2,538,826 | Avery | Jan. 23, 1951 |

FOREIGN PATENTS

| | | |
|---|---|---|
| 620,496 | Great Britain | Mar. 25, 1949 |